(12) United States Patent
Henrard

(10) Patent No.: US 10,608,523 B2
(45) Date of Patent: Mar. 31, 2020

(54) 12-PHASE TRANSFORMER RECTIFIER

(71) Applicant: Safran Electrical & Power, Blagnac (FR)

(72) Inventor: Pierre Henrard, Cazeres (FR)

(73) Assignee: Safran Electrical & Power, Blagnac (FR)

( * ) Notice: Subject to any disclaimer, the term of this patent is extended or adjusted under 35 U.S.C. 154(b) by 86 days.

(21) Appl. No.: 15/763,621

(22) PCT Filed: Sep. 28, 2016

(86) PCT No.: PCT/FR2016/052459
§ 371 (c)(1),
(2) Date: Mar. 27, 2018

(87) PCT Pub. No.: WO2017/055739
PCT Pub. Date: Apr. 6, 2017

(65) Prior Publication Data
US 2018/0287483 A1 Oct. 4, 2018

(30) Foreign Application Priority Data

Sep. 28, 2015 (FR) ...................... 15 59124

(51) Int. Cl.
*H02M 1/12* (2006.01)
*H02M 7/06* (2006.01)
*H02M 7/08* (2006.01)

(52) U.S. Cl.
CPC ............. *H02M 1/12* (2013.01); *H02M 7/068* (2013.01); *H02M 7/08* (2013.01); *B64D 2221/00* (2013.01)

(58) Field of Classification Search
USPC ......................................................... 307/9.1
See application file for complete search history.

(56) References Cited

U.S. PATENT DOCUMENTS

| 4,255,784 | A | * | 3/1981 | Rosa ................... | H02M 7/1552 363/129 |
| 6,198,647 | B1 | | 3/2001 | Zhou et al. | |
| 2010/0176755 | A1 | * | 7/2010 | Hoadley ................. | H02M 5/14 318/105 |

(Continued)

FOREIGN PATENT DOCUMENTS

| WO | 2012/116263 A1 | 8/2012 |
| WO | WO 2012/116263 | * 8/2012 |

OTHER PUBLICATIONS

International Search Report dated Oct. 23, 2017 in PCT/FR2016/052459 filed Sep. 28, 2016.

*Primary Examiner* — Rexford N Barnie
*Assistant Examiner* — Xuan Ly
(74) *Attorney, Agent, or Firm* — Oblon, McClelland, Maier & Neustadt, L.L.P.

(57) ABSTRACT

A 12-phase static electrical transformer rectifier including a transformer and first and second three-phase rectifier circuits for coupling to a load, the transformer including a primary circuit having three primary coils arranged in a star configuration and a secondary circuit including three first secondary coils and three second secondary coils that are distinct from the first secondary coils. The secondary circuit of the transformer includes a loop of six secondary coils formed by electrically connecting together the three first secondary coils and the three second secondary coils of the secondary circuit.

6 Claims, 4 Drawing Sheets

(56) References Cited

U.S. PATENT DOCUMENTS

2014/0016356 A1   1/2014   Furmanczyk et al.
2014/0313800 A1*  10/2014  Swamy .................. H02M 7/08
                                              363/126

* cited by examiner

US 10,608,523 B2

12-PHASE TRANSFORMER RECTIFIER

BACKGROUND OF THE INVENTION

The invention relates to a 12-phase static electrical transformer rectifier.

An electrical transformer is an electrical machine having a primary circuit and a secondary circuit. A transformer serves to modify the voltage and current values of the electricity as delivered by an alternating current (AC) source of electrical energy to the primary circuit of the transformer.

Conventionally on-board an aircraft, when there is a need to convert a three-phase AC voltage into a direct current (DC) voltage while providing isolation, use is made of a 12-phase static transformer rectifier, also known as a 12-pulse transformer rectifier unit (TRU).

In a static transformer, energy is transferred from the primary circuit to the secondary circuit via a magnetic circuit that is constituted by the body of the transformer. These two circuits are then magnetically coupled together, which serves to provide isolation between the two circuits.

As shown in FIG. 1, the 12-phase transformer rectifiers 100 in general use are constituted by a transformer 40 followed by two six-phase rectifiers 50 and 60, each formed by a bridge of six diodes 70 and coupled to a load 3 via two interphase inductors C. The transformer 40 comprises a primary circuit 110 having three primary coils 120 in a star configuration and coupled to the power supply network 2, and two secondary circuits 111 and 112.

The first secondary circuit 111 comprises three first secondary coils 130 in a star configuration with each of the free terminals 130b of the coils 130 coupled to a respective branch 50a, 50b, 50c of the first three-phase rectifiers 50.

The second secondary circuit 112 comprises three second secondary coils 140 in a delta configuration, with each of the three nodes 140b of the delta configuration being connected to a respective branch 60b of the second three-phase rectifier 60.

This topology corresponds to the network quality requirements expected for electricity networks in aviation.

In such a circuit, the phase-to-neutral secondary voltages of the transformer are phase shifted by 30°, i.e. by π/6. Because of this 30° phase shift between the phase-to-neutral secondary voltages, there is a phase shift of 30° between the two secondary line currents.

If the transformation ratio between the star primary winding and the star secondary is written m', and the transformation ratio between the star primary winding and the delta secondary is written $\underline{m}$, then it can be shown that there exists a simple relationship between $\underline{m}$ and m' for the circuit to operate, namely: $m = \sqrt{3} m'$.

The current flowing in the secondary windings can be determined simply. For the delta secondary, there exists a relationship between of the secondary line currents and the winding currents. This relationship is valid over time and it is possible to write:

$$\begin{cases} J_{2a}(t) = I_{2a}(t) - I_{2c}(t) \\ J_{2b}(t) = I_{2b}(t) - I_{2a}(t) \\ J_{2c}(t) = I_{2c}(t) - I_{2b}(t) \end{cases}$$

where $J_{2a}$, $J_{2b}$, $J_{2c}$ are the currents flowing respectively in the three second secondary coils 140 in a delta configuration, and $I_{2a}$, $I_{2b}$, $I_{2c}$ are the currents respectively delivered to each of the three branches 60a, 60b, 60c of the second rectifier circuit 60 to which the second secondary coils 140 in a delta configuration are coupled, as shown in FIG. 1.

The 12-phase transformer rectifier converts the three-phase AC voltages, e.g. having a root mean square (rms) voltage of 115 volts (V) or of 230 V, into a DC voltage of 28 V or of some other voltage, for example. This transformation is performed by the transformer and the two three-phase rectifiers.

At present there does not exist a solution based on a 12-phase transformer rectifier that is simple and reliable and that enables the quality of the electricity network to be improved still more effectively.

OBJECT AND SUMMARY OF THE INVENTION

The invention seeks to provide an alternative configuration for the secondary circuit of the transformer that makes it possible to improve the quality of the electric circuit by minimizing or even eliminating the first harmonic frequencies of the electrical power supply network current, thereby off-loading the electricity generators and improving the overall power factor of the electricity network.

The object is also to propose a solution for AC-DC conversion that is reliable, that is as simple as possible, and inexpensive, and with a power density that is at least equivalent to that of the equipment presently installed on board aircraft.

The invention firstly provides a 12-phase static electrical transformer rectifier comprising a transformer, and both a first six-phase rectifier circuit and also a second six-phase rectifier circuit that are for coupling to a load, the transformer comprising a primary circuit having three primary coils arranged in a star configuration and a secondary circuit comprising three first secondary coils and three second secondary coils that are distinct from the first secondary coils.

According to a general characteristic of the invention, the secondary circuit of the transformer comprises a loop of six secondary coils formed by electrically connecting together the three first secondary coils and the three second secondary coils of the secondary circuit.

The secondary circuit of the transformer thus proposes an alternative configuration for the secondary circuit of a transformer that presents a single secondary loop made up of the six coils.

This configuration also makes it possible to provide an AC-DC conversion solution that is as simple as possible and inexpensive, with a power density that is at least equivalent to that of equipment presently installed on board aircraft.

In a first aspect of the electrical transformer rectifier, each second secondary coil of the transformer is connected between two first secondary coils, and each first secondary coil is connected between two second secondary coils.

Thus, the hexagonal secondary winding of the secondary circuit is functionally equivalent to two interleaved delta windings. This arrangement makes it possible at least to provide output voltages of the same value, and thus to deliver voltages of the same value to the first and second rectifier circuits.

In a second aspect of the electrical transformer rectifier, the first secondary coils of the transformer present a first winding direction, and the second secondary coils present a second winding direction opposite to the first winding direction.

Putting the winding directions of the first and second secondary coils in opposition, in addition to alternating them, makes it possible to improve the quality of the electrical circuit by minimizing or even eliminating the first harmonic frequencies of the current of the electrical power supply network, thereby off-loading the electricity generators and improving the overall power factor of the electricity network.

In a third aspect of the electrical transformer rectifier, the three first secondary coils present a first dimension and the three second secondary coils present a second dimension distinct from the first dimension, the first and second dimensions being selected in such a manner that the three voltages measured between two output terminals of first secondary coils present a phase shift of 30° relative to the three voltages measured between the two output terminals of second secondary coils.

In order to satisfy the quality requirements for the electricity network on board an aircraft, the phase shift between the two delta configurations formed by the hexagonal secondary circuit needs to be 30°, i.e. $\pi/6$, as for a conventional transformer rectifier.

The phase shift of 30° between the two delta-equivalent secondary circuits makes it possible to satisfy the requirements concerning current harmonics that are required by aviation standards.

This dimensioning of the first and second secondary coils also makes it possible to configure the transformer so as to obtain phase shifts of 15° and of 45° between the secondary voltages measured on the secondary circuits and the primary voltages measured on the primary circuit.

In a fourth aspect of the electrical transformer rectifier, the winding of each secondary coil of the transformer extends from a first electrical connection terminal to a second electrical connection terminal, the second terminals of the first and second coils being electrically connected to the first three-phase rectifier circuit, and the first terminals of the first and second coils being electrically connected to the second six-phase rectifier circuit.

This arrangement makes it possible to deliver three first three-phase voltages that are identical in amplitude to the first rectifier circuit, and three second three-phase voltages that are identical in amplitude to the second rectifier circuit, the six voltages being identical in amplitude.

The invention also provides an electrical voltage conversion system including at least one electrical transformer rectifier as defined above.

The invention also provides an aircraft including at least one electrical voltage conversion system as defined above.

BRIEF DESCRIPTION OF THE DRAWINGS

The invention can be better understood by reading the following description, given by way of nonlimiting indication and with reference to the accompanying drawings, in which.

DETAILED DESCRIPTION OF EMBODIMENTS

Figure 2:
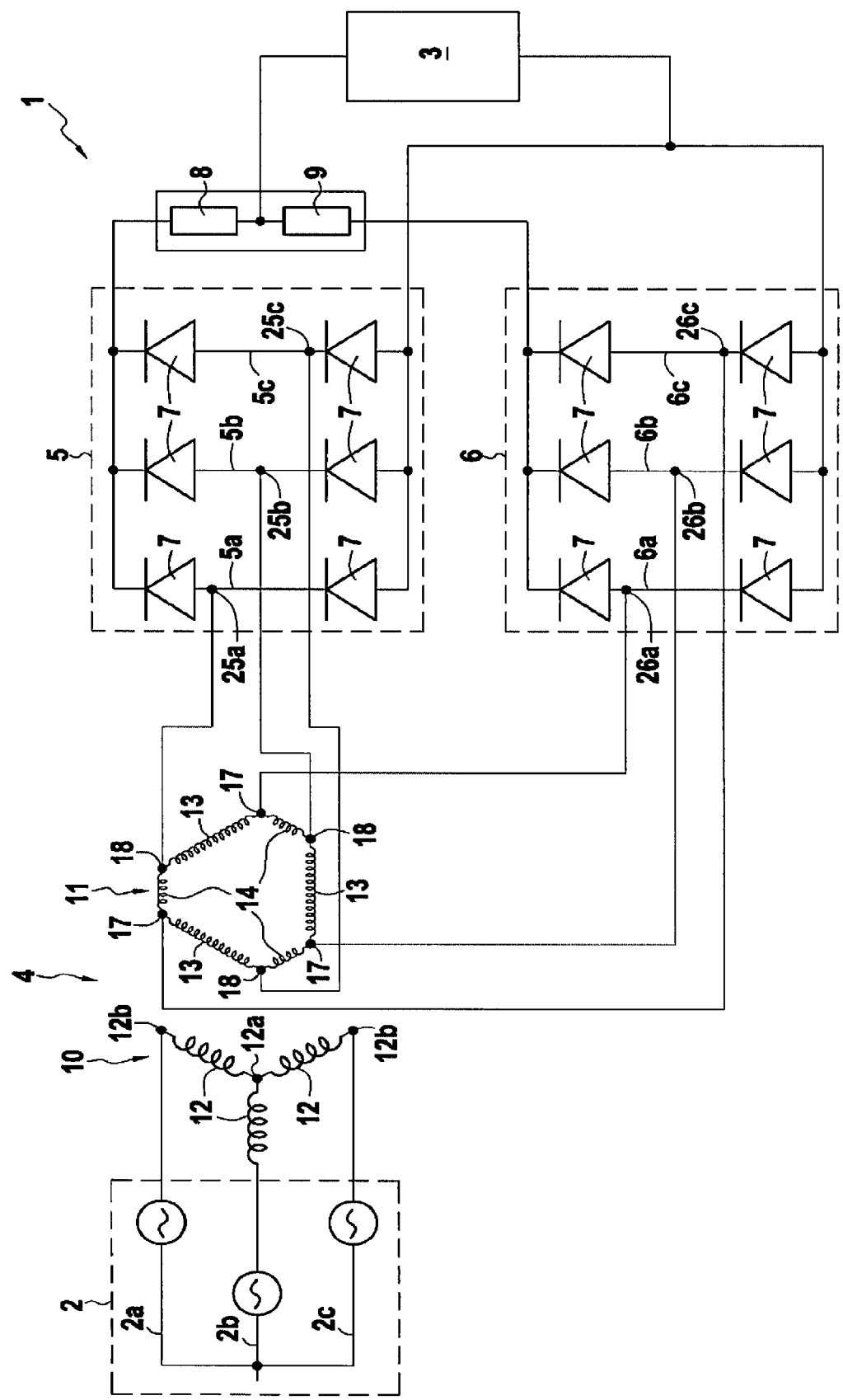
FIG. 2 shows diagrammatically a transformer rectifier in an embodiment of the invention.

FIG. 2 is a schematic diagram of an electrical system comprising a 12-phase electrical transformer rectifier 1 in an embodiment of the invention. The transformer rectifier 1 is coupled to an input electricity network 2 and to an output load 3 via interphase inductors 8 and 9.

The transformer rectifier 1 comprises a transformer 4, a first six-phase rectifier 5, and a second six-phase rectifier 6.

Each six-phase rectifier 5 and 6 is made up of a bridge of six diodes 7 connected in three branches 5a, 5b, 5c and 6a, 6b, 6c, each of two diodes 7 connected to conduct in the same direction. Each branch 5a, 5b, 5c and 6a, 6b, 6c of a six-phase rectifier 5 and 6 has a respective input terminal 25a, 25b, 25c and 26a, 26b, 26c arranged between the two diodes 7 of the branch 5a, 5b, 5c or 6a, 6b, 6c such that a first diode 7 is conductive for a positive current flowing in the branch 5a, 5b, 5c or 6a, 6b, 6c while the second diode 7 is not conductive, and conversely the second diode 7 is conductive for a negative current flowing in the branch 5a, 5b, 5c or 6a, 6b, 6c while the first diode 7 is not conductive.

Each of the two rectifiers 5 and 6 has its output coupled to the load 3 via the two interphase inductors 8 and 9.

The transformer 4 has a primary circuit 10 and a secondary circuit 11.

The primary circuit 10 is made up of three primary coils 12 in a star configuration. Each primary coil 12 of the primary circuit 10 thus possesses a first terminal 12a coupled to the other two primary coils 12, and a second terminal 12b that is distinct from the first terminal 12a and that is electrically connected to a respective one of the phases 2a, 2b, 2c of the electrical power supply network 2. By way of example, the second terminal 12b of each primary coil 12 is connected to a respective phase 2a that is distinct from the other phases, 2b and 2c in the example described, which phases are connected to the second terminals 12b of the other two primary coils 12.

Figure 3:
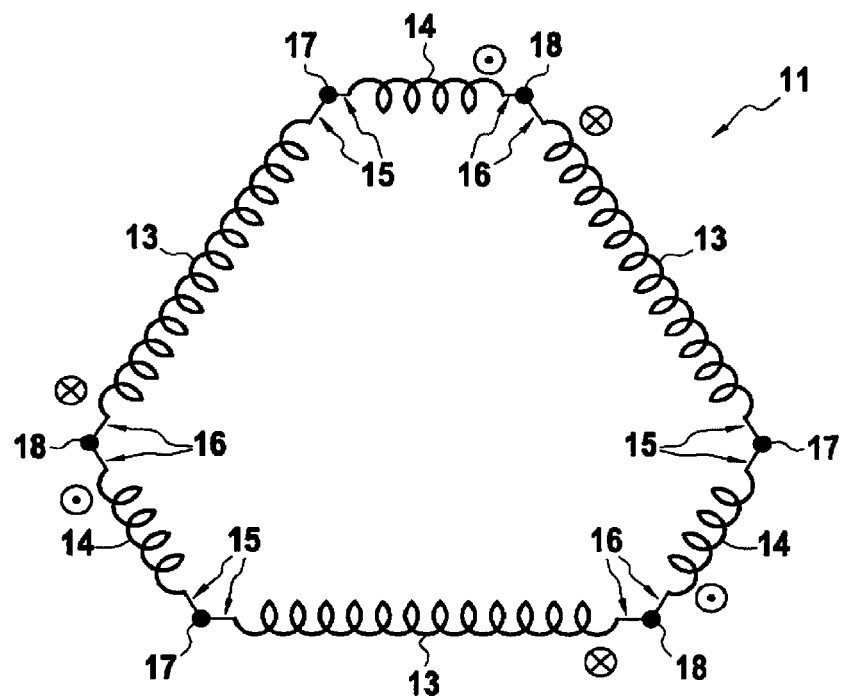
FIG. 3 shows diagrammatically the transformer of the FIG. 2 transformer rectifier.

The secondary circuit 12, which is shown in greater detail in FIG. 3, forms a loop of six secondary coils 13 and 14. More particularly, the loop comprises three first secondary coils 13 and three second secondary coils 14.

The three first secondary coils 13 are of the same first dimension and they are wound in the same first direction. The three second secondary coils 14 are of the same second dimension, different from the first dimension, and they are wound in the same second winding direction, different from the first winding direction.

Since a coil possesses only two possible winding directions, the second winding direction is opposite to the first winding direction. The winding directions of the coils 13 and 14 are indicated in FIG. 3 in conventional manner by means of a dot in a circle to indicate the first winding direction and by means of a cross in a circle to indicate the second winding direction.

Thus, if it is considered that each secondary coil 13 and 14 has a start-of-winding terminal 15 and an end-of-winding terminal 16, with each of the secondary coils 13 or 14 being wound from the start-of-winding terminal 15 to the end-of-winding terminal 16, as shown in FIG. 3, then the secondary circuit 12 has three first nodes 17, each having coupled thereto a start-of-winding terminal 15 of a first secondary coil 13 and a start-of-winding terminal 15 of a second secondary coil, and three second nodes 18, each having coupled thereto an end-of-winding terminal 16 of a first secondary coil 13 and an end-of-winding terminal 16 of a second secondary coil.

Each of the three first nodes 17 is electrically connected to a respective distinct branch 25a, 25b, 25c of the first rectifier circuit 5.

Each of the three second nodes 18 is electrically connected to a respective distinct branch 26a, 26b, 26c of the second rectifier circuit 6.

The first and second secondary coils 13 and 14 have respective first and second dimensions selected to present a phase shift of 30° between the two secondary voltages and phase shifts of 15° and of 45° between the secondary voltages and the primary voltages, so as to be in phase with the fundamental frequencies of the primary currents.

Figure 1:
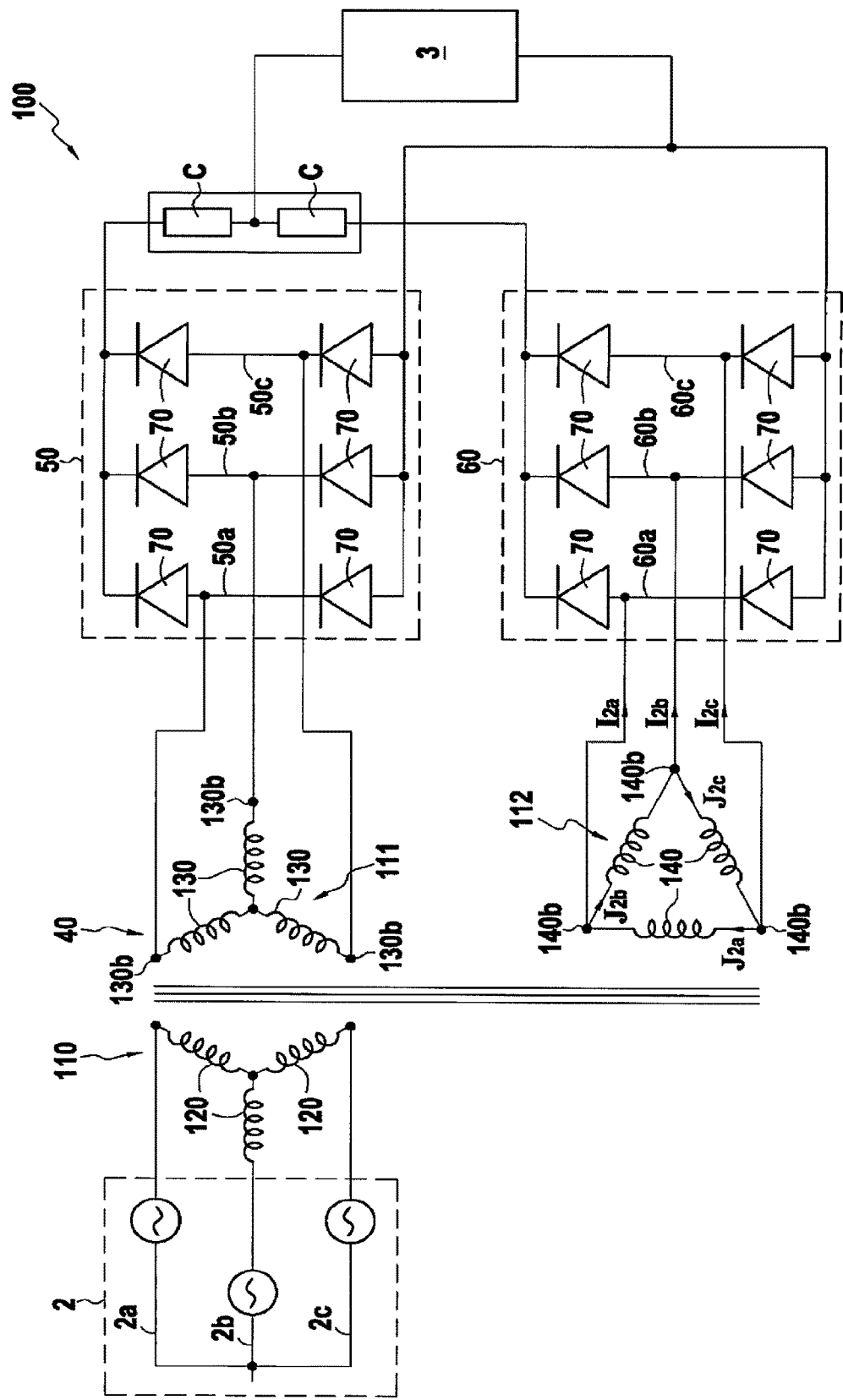
FIG. 1, described above, shows a prior art transformer rectifier.

The transformation ratios of the transformer rectifier 1 compared with a prior art transformer rectifier having a secondary comprising three secondary coils in a delta configuration and three secondary coils in a star configuration as shown in FIG. 1 are as follows:

$$m_1 = 2m'\sin\left(\frac{\pi}{4}\right)$$

$$m_2 = 2m'\sin\left(\frac{\pi}{12}\right)$$

where m' is the transformation ratio between the star primary winding and the star secondary of a conventional transformer rectifier as shown in FIG. 1, $m_1$ is the transformation ratio between the star primary winding and the winding presented by the long sides of the hexagon of the transformer rectifier 1, i.e. with the first secondary coils 13, and $m_2$ is the transformation ratio between the star primary winding and the winding presented by the short sides of the hexagon of the transformer rectifier 1, i.e. with the second secondary coils 14.

The transformer rectifier 1 of the invention, when it is used in parallel with a transformer rectifier having two secondary circuits as shown in FIG. 1 and of equivalent power, serves to minimize or even eliminate the eleventh and thirteenth current harmonics of the network constituted in this way.

Figure 4:
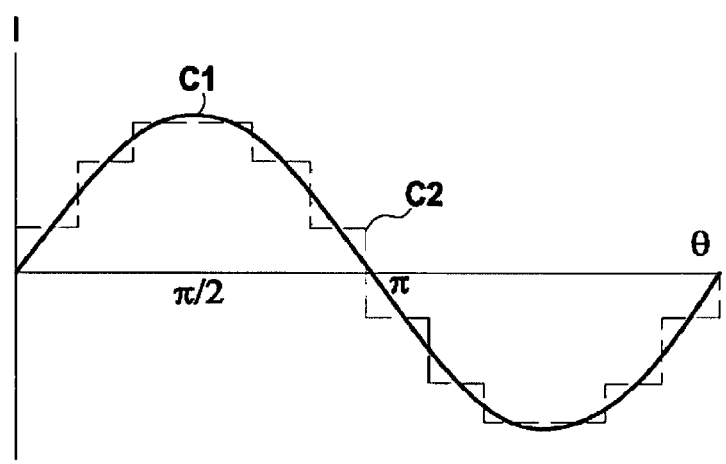
FIG. 4 is a plot showing the input phase current of a conventional prior art transformer rectifier.
Figure 5:
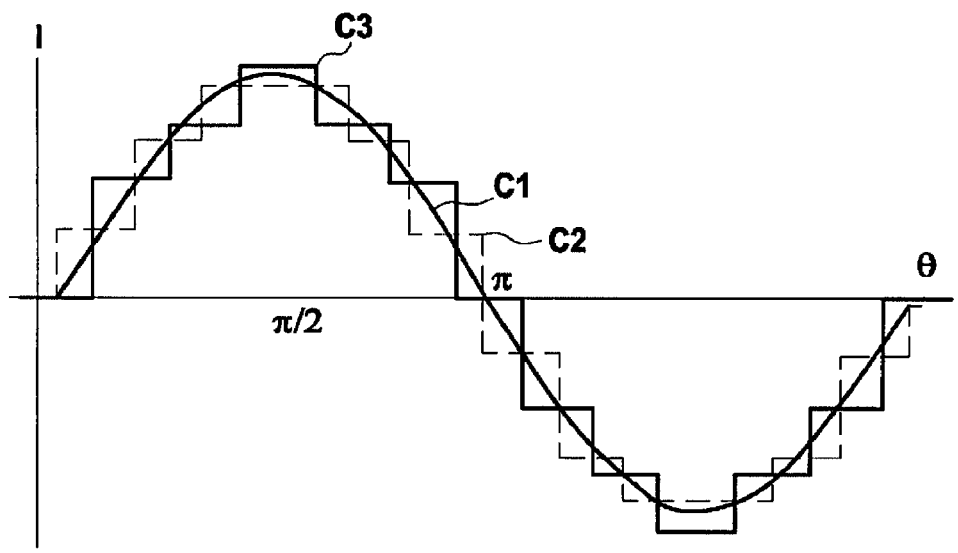
FIG. 5 is a plot showing the input phase current of a transformer rectifier in an embodiment of the invention.
Figure 6:
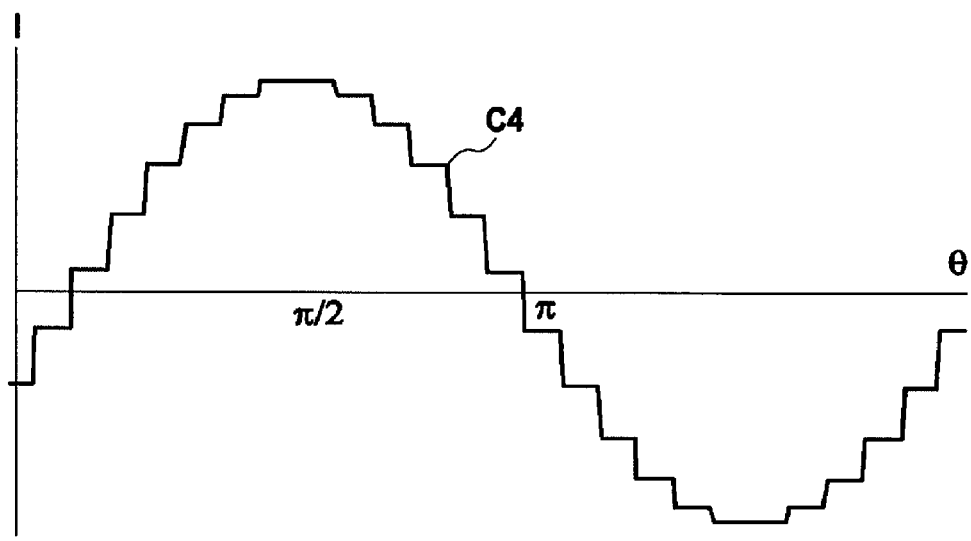
FIG. 6 is a plot showing the input phase current of a 24-pulse transformer rectifier in an embodiment of the invention.

Specifically, this depends in particular on the waveform of the input current. FIG. 4 is a plot of the input phase current of a conventional prior art transformer rectifier, with current I plotted up the ordinate axis and phase θ plotted along the abscissa axis. The curve C1 shows the neutral phase voltage. The waveform of the input current of a phase of a conventional transformer rectifier is given by the waveform of the curve C2 in the plot of FIG. 4. And the waveform of the input current for the same phase of the transformer rectifier 1 of the invention is given by the waveform of the curve C3 in the plot of FIG. 5, which plots current I up the ordinate axis and phase θ along the abscissa axis. In order to facilitate comparison, the curves C1 and C2 of FIG. 4 are also plotted on FIG. 5. The sum of two input currents then corresponds to the waveform of the input phase current of a 24-pulse transformer rectifier given by the waveform of the curve C4 on the plot of FIG. 6, thereby eliminating current harmonics 11 and 13 when the powers absorbed by the two 12-phase transformers are equal. This result is thus obtained since the level portions of the two 12-phase transformer rectifiers present a phase shift through an angle of π/12 that stems from the particular geometry of the primary and secondary windings of the transformer rectifier 1 of the invention.

The invention claimed is:

1. A 12-phase static electrical transformer rectifier comprising:
 a transformer; and
 first and second three-phase rectifier circuits for coupling to a load, wherein
 the transformer comprises a primary circuit having three primary coils arranged in a star configuration and a secondary circuit comprising three first secondary coils and three second secondary coils that are distinct from the first secondary coils,
 the secondary circuit comprises a loop of six secondary coils formed by electrically connecting together the three first secondary coils and the three second secondary coils of the secondary circuit, and
 a winding of each secondary coil of the transformer extends from a first electrical connection terminal to a second electrical connection terminal, second connection terminals of the first and second coils being electrically connected to the first three-phase rectifier circuit, and first connection terminals of the first and second coils being electrically connected to the second three-phase rectifier circuit.

2. The electrical transformer rectifier according to claim 1, wherein each second secondary coil of the transformer is connected between two first secondary coils, and each first secondary coil is connected between two second secondary coils.

3. The electrical transformer rectifier according to claim 1, wherein the first secondary coils of the transformer present a first winding direction, and the second secondary coils present a second winding direction opposite to the first winding direction.

4. The electrical transformer rectifier according to claim 1, wherein the three first secondary coils present a first dimension and the three second secondary coils present a second dimension distinct from the first dimension, the first and second dimensions being selected in such a manner that three voltages measured between two output terminals of first secondary coils present a phase shift of 30° relative to three voltages measured between two output terminals of second secondary coils.

5. An electrical voltage conversion system comprising:
 at least one electrical transformer rectifier that includes a transformer that comprises a primary circuit having three primary coils arranged in a star configuration and a secondary circuit comprising three first secondary coils and three second secondary coils that are distinct from the first secondary coils, wherein
 the secondary circuit comprises a loop of six secondary coils formed by electrically connecting together the three first secondary coils and the three second secondary coils of the secondary circuit, and
 a winding of each secondary coil of the transformer extends from a first electrical connection terminal to a second electrical connection terminal, second connection terminals of the first and second coils being electrically connected to a first three-phase rectifier circuit, and first connection terminals of the first and second coils being electrically connected to a second three-phase rectifier circuit.

6. An aircraft comprising:
 at least one electrical voltage conversion system including at least one electrical transformer rectifier that includes a transformer that comprises a primary circuit having three primary coils arranged in a star configuration and a secondary circuit comprising three first secondary coils and three second secondary coils that are distinct from the first secondary coils, wherein the secondary circuit comprises a loop of six secondary coils formed by electrically connecting together the three first secondary coils and the three second secondary coils of the secondary circuit, and a winding of each secondary coil of the transformer extends from a first electrical connection terminal to a second electrical connection terminal, second connection terminals of the first and second coils being electrically connected to a first three-phase rectifier circuit, and first connection terminals of the first and second coils being electrically connected to a second three-phase rectifier circuit.

* * * * *